United States Patent [19]

Fouss et al.

[11] 4,286,808
[45] Sep. 1, 1981

[54] SNAP-IN TEE CONNECTOR

[75] Inventors: James L. Fouss; John J. Parker, both of Findlay, Ohio

[73] Assignee: Hancor, Inc., Findlay, Ohio

[21] Appl. No.: 67,808

[22] Filed: Aug. 20, 1979

[51] Int. Cl.³ ............................................... F16L 3/04
[52] U.S. Cl. ..................................... 285/158; 285/197; 285/319; 285/423; 285/DIG. 4; 285/DIG. 22
[58] Field of Search ............... 285/158, 156, 197, 189, 285/DIG. 4, 423, 424, 397, 194, 196, 205, DIG. 22, 208, 209, 210, 370, 319

[56] References Cited

U.S. PATENT DOCUMENTS

| | | | |
|---|---|---|---|
| 2,823,932 | 2/1958 | Schigut | 285/DIG. 22 |
| 3,214,199 | 10/1965 | Brooks | 285/189 |
| 3,369,071 | 2/1968 | Tuisku | 285/158 X |
| 3,471,179 | 10/1969 | Sixt | 285/237 X |
| 3,490,791 | 1/1970 | Mitchell | 285/162 X |
| 3,551,007 | 12/1970 | Martin et al. | 285/156 |
| 3,565,466 | 2/1971 | Mullings | 285/158 |
| 3,596,936 | 8/1971 | Dieckmann | 285/149 |
| 3,650,551 | 3/1972 | Akers | 285/158 |
| 3,669,473 | 6/1972 | Martin et al. | 285/197 |
| 3,730,565 | 5/1973 | Steudler | 285/158 |
| 3,899,198 | 8/1975 | Morosuhuk | 285/27 |
| 4,058,261 | 11/1977 | Pollart | 239/542 |

FOREIGN PATENT DOCUMENTS

| | | | |
|---|---|---|---|
| 964310 | 3/1975 | Canada | 285/156 |
| 2340792 | 2/1974 | Fed. Rep. of Germany | 285/DIG. 22 |
| 2257848 | 8/1975 | France | 285/162 |
| 902508 | 8/1962 | United Kingdom | 285/DIG. 22 |

Primary Examiner—Dave W. Arola
Attorney, Agent, or Firm—Fay & Sharpe

[57] ABSTRACT

A tee connector for coupling a corrugated tubing lateral normal to a larger diameter corrugated tubing main with a circular aperture in its side wall. The connector has a first end with a circular periphery sized to be received in the aperture. The first end is configured with two arcuate longitudinal recesses separated by two arcuate protuberances to conform with the interior surface of the main. Adjacent the first end are positioning projections which abut the exterior surface of the main to position the connector normal to the main. Also, adjacent the first end are tabs which are snapped through the aperture to engage the interior surface of the main. The lateral is received in a bore in the second end. The length that is received is limited by limiting projections in the bore adjacent the first end. Detents on the interior surface of the bore engage the corrugations of the lateral to inhibit its removal from the connector.

15 Claims, 4 Drawing Figures

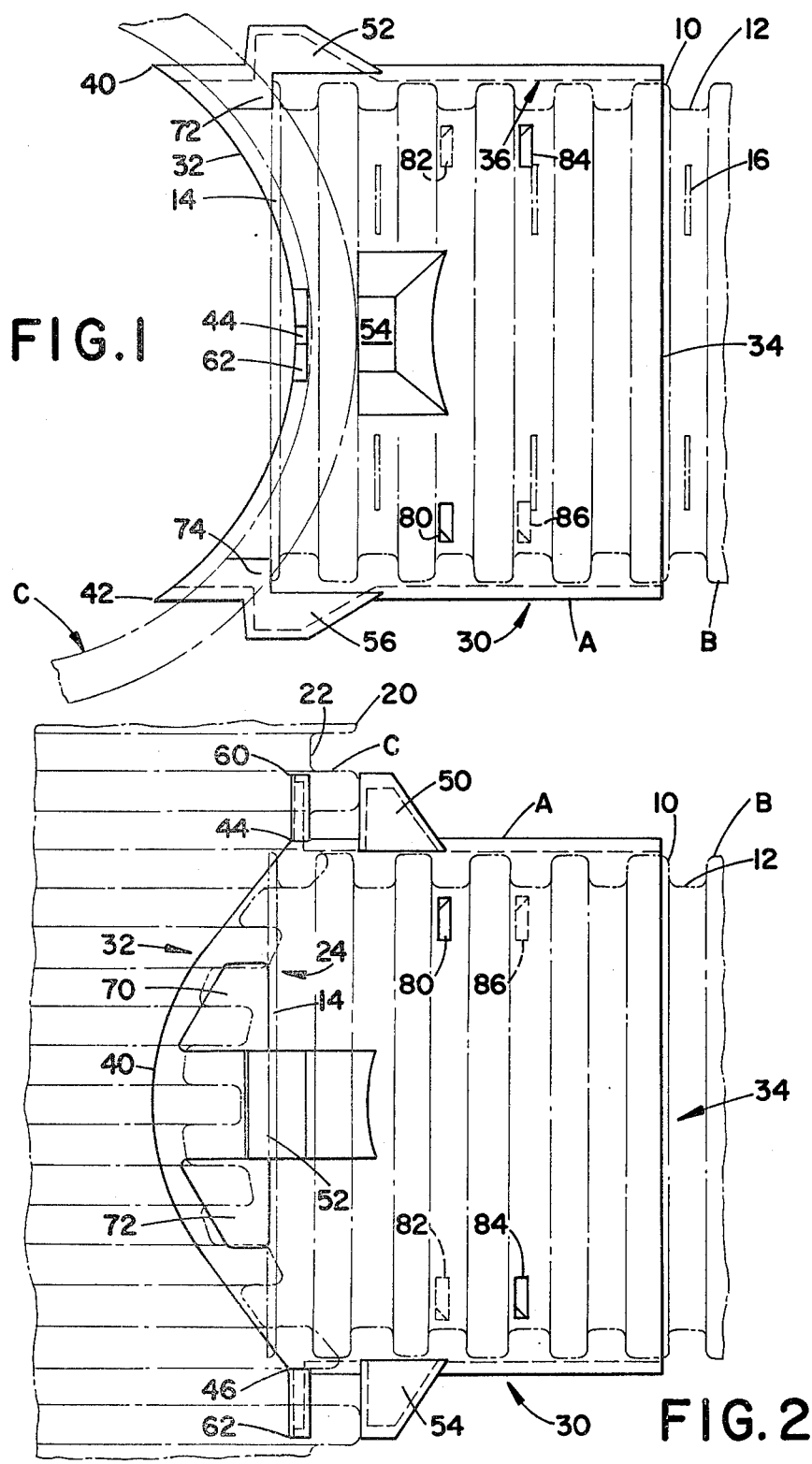

SNAP-IN TEE CONNECTOR

BACKGROUND OF THE INVENTION

This application is directed to the art of pipe joints, couplings, connectors and more particularly, to tee joint coupling constructed for plastic pipe or tubing. The invention is particularly applicable to connecting corrugated plastic tubing laterals with a larger diameter corrugated plastic tubing main and will be described with particular reference thereto. It will be appreciated, however, that the invention has broader applications and may be incorporated as an integral part of the tubing or may be sized and configured to accomodate connecting different tubings, different sizes of tubings, or tubing connections with different angular orientations such as a Y coupling.

Corrugated plastic tubing is widely used for many types of drainage systems and filtration systems. Corrugated tubing is typically molded of a high density polyethylene or polyvinylchloride and is supplied in continuous lengths. The tubing is generally cylindrical and has corrugated internal and external wall surfaces defined by adjacent circumferentially extending, longitudinally spaced peaks and valleys along the length of the tubing. Lengths of corrugated plastic tubing are interconnected at generally T-shaped and other intersections.

In a subterranean installation for drainage or septic purposes, it is common to have a corrugated plastic tubing main sized to carry a relatively large flow of fluid materials. Commonly corrugated plastic tubing laterals are sized to carry a lesser flow of fluid materials and are connected with the main by generally T-shaped intersections. Heretofore, there have been many different types and styles of tee joints or couplings. Tee couplings are commonly simple in construction to facilitate ease of assembly. Yet, the couplings should be strong in construction to resist forces exerted by the earth which is back filled in burying a subterranean installation. The amount of physical manipulations required to connect a lateral and the main with a tee coupling is reflected in the cost of installation of a subterranean tubing system. Prior couplings have included a conventional slip or external tee such as that shown in U.S. Pat. No. 3,551,007. To install such a tee, it is necessary to cut and remove a section of the theretofore continuous main and insert the slip tee in its place. If the lateral is of a lesser diameter than the main, a reducer is inserted between the tee and the lateral. Prior couplings also include the "saddle tee"such as that shown in U.S. Pat. No. 3,669,473. To install such a tee, a hole is cut in the side of the main, the earth excavated below the main adjacent the hole, and the tee expanded and snapped around the main, fitting like a tight saddle. A third tee coupling or connection has been made by cutting a hole in the side of the main and ramming a smooth wall tubing adapter, such as the adapter shown in U.S. Pat. No. 3,471,179, forcibly or loosely into the aperture.

Although these tee couplings and connectors have proved to be reasonably successful, there are some deficiencies which detract from their use. The slip and saddle tees are relatively large, require a relatively large amount of plastic to manufacture and are bulky to transport. Inserting a slip or saddle tee requires a relatively large amount of manipulation. The required manipulation includes not only drilling or cutting the main, but may require lifting the main and excavating under it or regrading to accomodate that part of the tee coupling which extends below the bottom surface of the main.

The other disadvantage of the prior art is that cutting a hole in the side of the main greatly reduces its strength. To compensate for the lost strength, slip and saddle tees are generally constructed with relatively thick walls. The smooth-walled tubing adapter provides substantially no reinforcement for the cut and weakened main. In addition to weakening the main, the use of a smooth-walled tubing adapter obstructs the flow of fluids through the main by protruding into it. It is clearly desirable to reduce the manipulative steps required to insert a tee coupling and to minimize a decrease in the strength of a tee coupling.

The present invention contemplates a new and improved tee coupling which provides simpler installation with greater strength than the prior art tee couplings. Further, this invention contemplates a tee connector which is simpler and more economical to manufacture.

BRIEF DESCRIPTION OF THE INVENTION

In accordance with the present invention, a connector is provided for connecting an end of a first corrugated conduit with a second conduit having an aperture in its side wall. The second conduit has an interior surface and an exterior surface. The connector comprises a sleeve having a first and second end. The first end of the connector has a configuration which is sized and shaped to be received within the aperture in the side wall of the second conduit. The connector further comprises a positioning means disposed adjacent the first end and adapted to position the connector relative to the exterior side wall surface of the second conduit. An engaging means disposed adjacent the first end is adapted to engage the interior surface of the second conduit. A bore extend longitudinally between the first and second ends of the connector.

In accordance with a more limited aspect of the invention, limiting means are provided for limiting sliding engagement between the first corrugated conduit and the second end. Further engaging means are provided to inhibit the sliding disengagement of the first conduit and the second end.

In accordance with another aspect of the invention, there is provided a connector which comprises a sleeve with a first end and a second end and with a bore extending longitudinally between the first and second ends. The first end has a configuration which is generally circular around its periphery and which has two longitudinal recesses separated by two generally sinusoidal longitudinal protuberances. A projectionprojecting into the periphery of the first end is disposed adjacent one of the sinusoidal protuberances. A tab means projecting from the periphery of the first end is disposed adjacent one of the recesses. A detent projects from the sleeve.

The tee connector of the present invention provides many advantages over prior art tee couplings or connectors. A primary advantge is the ease with which the present connector connects a lateral with a continuous main.

Another advantage of the present invention is that there is relatively little disturbance of the main during attachment.

Another advantage of the present invention is that it increases strength of the interconnection with the use of a minimal amount of plastic material.

Yet another advantage of the present invention is its simplicity and economy of manufacture, and ease of shipment.

Still other advantages and uses of the invention in the same or similar environments will become apparent to those skilled in the art upon reading and understanding the following specification.

BRIEF DESCRIPTION OF THE DRAWINGS

The invention may take physical form in certain parts and arrangements of parts, preferred and alternate embodiments of which will be described in detail in the specification and illustrated in the accompanying drawings which form a part thereof.

FIG. 1 is a side elevational view of a tee connector installed to connect a corrugatd main with the end of a corrugated tubing lateral, in which the tubing is shown in phantom for ease of illustration;

FIG. 2 is a top view of the tee connector of FIG. 1;

DESCRIPTION OF THE PREFERRED EMBODIMENT

Figure 3:
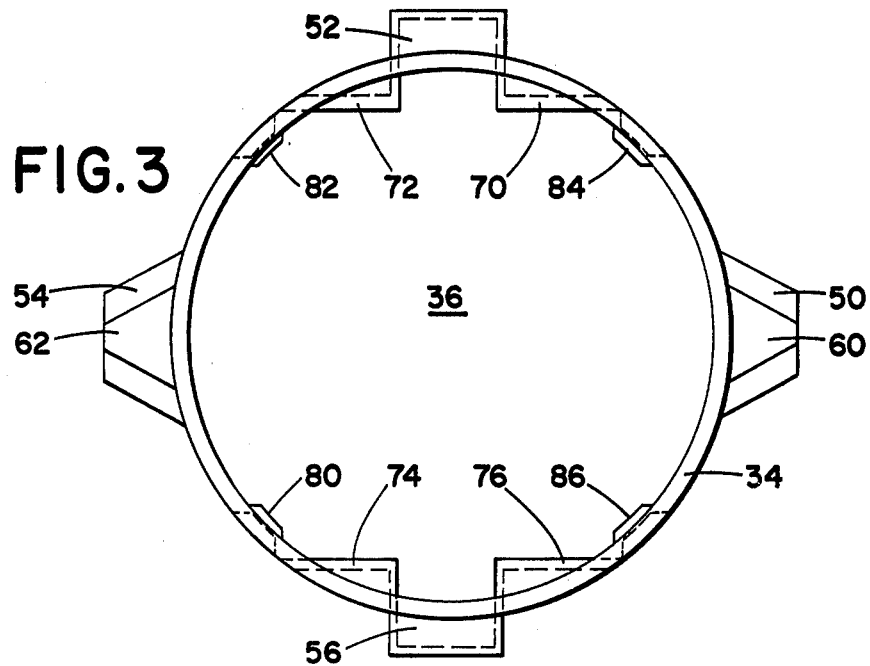
FIG. 3 is an end elevational view of the coupling of FIG. 1.

The drawings are for the purposes of illustrating a preferred embodiment of the invention only and not for purposes of limiting it. FIGS. 1 and 2 show side and top elevational views respectively of a tee connector A utilized to join the end of a corrugated tubing lateral B with a corrugated tubing main C.

With regard to the construction of tubing laterals B and mains C, each comprises a hollow, generally cylindrical plastic tubing having corrugated side walls. This tubing is typically formed by conventional blow molding or continuous extrusion techniques from high density thermoplastics. The corrugated tubing lateral B comprises a series of corrugations, each made up of a peak 10 and a valley 12 which extend circumferentially around the side wall of the tubing. The lateral B has an end 14 which is restrained by the connector A. If the lateral B is to be used for drainage purposes, slots 16 are generally cut into the valley portions of the lateral tubing.

The main C is commonly a plastic tubing with its side walls defined by a series of corrugations comprising alternating peaks 20 and valleys 22 extending circumferentially around the side wall of the tubing. The corrugated main C is illustrated with a circular aperture 24 in the side wall. The circular aperture is commensurate in size with the outer diameter of the connector. To accomodate a circular aperture of the outer diameter of the connector, the main has an inner diameter which exceeds the outer diameter of the lateral B. It will be appreciated, however, that the connector may include an integral diameter reducer to fit within an aperture smaller in diameter than the lateral. Such a constriction, however, might obstruct the flow of fluids through the lateral. If the aperture is smaller than the inner diameter of the lateral, it is preferred that the lateral be received offset from the aperture in such a manner that a dam is not formed and standing water is not held within the lateral. Corrugated tubing such as is used for the main and laterals is available in long, continuous lengths of various diameters. Common diameters for the laterals are 4 inches, for the main 6 inches and for the circular aperture 4⅜ inches. Such tubing is currently available in continuous lengths of as long as 5000 feet.

The connector A of the preferred embodiment is designed to connect a cylindrical corrugated plastic tubing lateral with a side wall of a cylindrical corrugated plastic tubing main at generally a 90 degree angle. The connector A is formed by a body 30 having a generally sleeve-like configuration. The sleeve has a first end 32 which is adapted to fit into the main and a second end 34 which is adapted to receive the end of the corrugated lateral. The sleeve has a passage extending between the first and second ends to allow fluid flow through the coupling. In the preferred embodiment, the passage is defined by a bore 36 with a diameter commensurate with the outer diameter of lateral B.

First end 32 has a configuration which comprises a periphery which generally conforms to the shape of aperture 24 in the side wall of main C. In the preferred embodiment, the periphery is generally circular. The configuration further comprises two generally arcuate or sinusoidal protuberances 40 and 42 which are oppositely disposed about the diameter of the circular periphery. Between the two protuberances, are two generally arcuate or bell-shaped longitudinal recesses 44 and 46. The protuberances and recesses are shaped in such a manner that the first end conforms generrlly with the interior surface of the main around the aperture 24. By conforming generally with the interior surface of the main rather than projecting into the interior of the main, the coupling has little effect on fluid flow capacity in the main. It will be appreciated that the configuration of the first end can be adapted to conform generally to the interior surface of mains having arched, square, or other cross-sections.

Disposed adjacent the first end of the sleeve is a positioning means for positioning the coupling relative to the side wall main. The positioning means comprises four positioning projections, 50, 52, 54 and 56 which project radially outward from the exterior surface of the sleeve adjacent first end 32. These four positioning projections are adapted to abut the exterior surface of main C to position a central axis of the connector generally normal to a central axis of main C. It will be appreciated that by shifting the relative position of the positioning projections, the positioning means can position connector A relative to main C at other than right angles, for example, a Y coupling.

Also disposed adjacent the first end 32 is a first engaging means for engaging the interior surface of the main for securing connector A with main C. In the preferred embodiment, the securing means comprises a pair of tab means 60 and 62 configured to snap through the aperture and abut the interior surface of the main. The tab means are disposed adjacent recesses 44 and 46. By positioning the tab means adjacent recesses 44 and 46, the tabs prevent connector A from being rotated or removed after it is assembled into main C. If one would attempt to rotate connector A, the arcuate wall of main C would attempt to cam the tab means 60 abd 62 radially inward toward its central axis; at the same time, the exterior surface of main C adjacent the aperture would attempt to cam projections 52 and 56 of the positioning means radially outward from the central axis of main C. These diametrically opposed camming forces prevent the coupling from rotating. Other arrangements for the tab means and positioning means may also be employed to prevent rotation. Because the surface of a trench limits the motion of the connector after a lateral is received, a single tab means may be employed.

Second end, 34 of connector A is adapted to receive the end of lateral B. In the preferred embodiment, connector A is externally coupled with lateral B. That is, the sleeve of connector A slips around the exterior of the lateral. Alternately, internal coupler arrangements in which end 34 slides into the interior of the end of lateral B may be empolyed. The corrugations in lateral B provide excellent compressive strength. Accordingly, it is desirable to insert the corrugated tubing as far into coupler A as possible so that the corrugations of lateral B may add to the compressive strength of coupler A. In the preferred embodiment, lateral B extends into the coupler as far as and slightly beyond recesses 44 and 46. Because the received tubing provides adequate compressive strength, the sleeve may be relatively thin. To prevent the lateral from extending into the main and obstructing the flow therethrough, a limiting means is provided for limiting the movement of lateral B in the direction radially toward the central axis of main C. This limiting means comprises four limiting projections 70, 72, 74, and 76 projecting into bore 36 of the sleeve (note FIG. 3). These projections are disposed adjacent protuberances 40 and 42 and positioning projections 52 and 56.

The connector further comprises second engaging means for engaging the corrugations of the lateral to hold the lateral within the coupling. This second engaging means comprises a plurality of detents 80, 82, 84 and 86 projecting into bore 36. Detents 80 and 82 are displaced longitudinally from detents 84 and 86 by an even multiple of the spacing between corrugation peaks 10 of lateral B. The detents are sufficiently resilient that they flex as the corrugations of the lateral snap past them.

Figure 4:
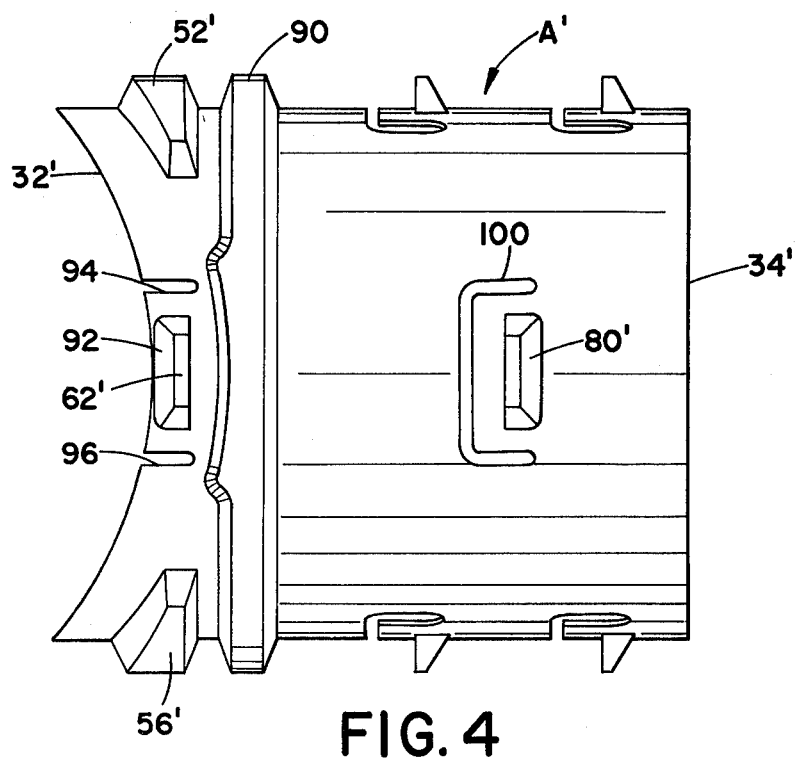
FIG. 4 is a side elevational view of an alternate embodiment of a tee connector in accordance with the present invention.

FIG. 4 illustrates a side elevational view of an alternate embodiment of a tee connector. In FIG. 4, like elements with the embodiment of FIGS. 1–3 are marked with a like reference numeral followed by a prime ('). Connector A' consists of a generally sleeve-like body having a first end 32' and a second end 34'. The first end 32' has a periphery which conforms to the aperture to be cut into a main and a configuration which conforms with the interior surface of the main. the positioning means comprises projections 52' and 56' which may form part of corrugation segments for reinforcing the compressive strength of the connector. The positioning means may further comprise a part of a peak of corrugation 90 which is adjacent the positioning means. The first engaging means comprises a tab means 62' which has a camming surface 92 disposed generally toward the center of a main. A pair of recesses 94 and 96 may be cut into the sleeve to allow the tab means 62' to be cammed more easily as the coupler is inserted into the aperture.

The second end 34' is adapted to receive a corrugated lateral around its exterior surface. A limiting means comprises peak 90 against which the end corrugated lateral abuts to limit its travel over the sleeve.

The second engaging means comprises a series of detents such as 80' which are adjacent slots 100 to increase the ease with which corrugations may be cammed over the detents.

The connector may take numerous other forms if other types of pipe and tubing are to be connected. For example, if smooth-walled pipe is to be used, the detents may be deleted or may be replaced by a series of low annular rings. Further, if the laterals are to be other than circular tubing, then the configuration of the second end may be modified and conformed to the shape of the tubing used for the laterals. For example, if generally arch-shaped tubing were to be used, the configuration of the second end would also be generally arch-shaped. Futher, if other than round apertures are to be cut in the main, then the first end of the connector may be modified to match the shape of the apertures to be cut. However, because round holes are generally the easiest to cut, it is desirable to make the first end suitable for insertion within a round aperture regardless of the shaped tubing which is to be connected to the second end of the connector.

The connectors may be manufactured with any of numerous conventional manufacturing techniques, including vacuum molding and blow molding. Further, connectors may be manufactured integral with the end of tubing in standard lengths. With an integral coupling, the second end would be a section of corrugated plastic pipe. This would alleviate the need for the limiting means and second engaging means.

To use the connectors in conjunction with drainag tubing in a farm field by way of example, a trench machine is used to dig a central trench for the main and a plurality of trenches at right angles to the central trench for the laterals. A continuous length of corrugated tubing, such as six inch tubing, is layed in the trench to form the main. Circular apertures are cut or drilled horizontally into the side wall of the main at each point where a lateral is to be joined. Unlike prior tee connectors, the present connectors allow laterals to be joined to the main diametrically opposite each other. After drilling the horizontal aperture, the connectors are manually snapped into the apertures. One of the tab means 60 or 62 is inserted adjacent the interior wall of the main and manual pressure is applied to the coupling to snap the other tab means through the opening so that it also engages the interior wall of the main. Lengths of corrugated tubing, such as four inch tubing, are layed in the trenches normal to the main trench. With manual pressure, the ends are pushed longitudinally into the connector with sufficient force to snap the corrugations past the detents until the end of the lateral is abutting the limiting means. The trenches are then back filled to complete the installation.

In addition to the preferred and alternate embodiments described, the present invention may also be adapted for use in conjunction with other types of constructions. For example, the tees may be manufactured integrally in conjunction with elbows, reducers, Y's, tees, or the like. Moreover, the first end of the tee coupler may be dimensioned for installation into the side wall of tubing or a fluid reservoir of most any size and configuration. Further, the second end may be adapted to receive tubing of most any size and configuration. Still other modifications will become apparent to others upon reading and understanding the present specification. It is our intention to include all such modifications and alterations insofar as they come within the scope of the appended claims and the equivalents thereof.

We claim:
1. A connector comprising:
a sleeve having a first and a second end, said sleeve having a bore extending longitudinally between said first and second ends;
said first end being cylindrical and having a configuration which is generally circular around its periphery and having two generally arcuate longtitudinal recesses separated by two generally arcu- ate longitudinal protuberances, each arcuate recess having an apex at its maximum longitudinal recession and each arcuate protuberance having an apex at its maximum longitudinal protrusion, the first end is adapted to be received in a circular aperture which is commensurate in size and shape with the circular periphery cut into an arcuate side wall of a corrugated conduit with the longitudinal recesses and protuberances conforming generally with the interior surface of the conduit;

a first circumferentially discontinuous projection projecting radially outward from the periphery of said first end, said first projection being disposed generally contiguous with the apex of one of the arcuate protuberances, such that the projection limits penetration into the aperture and causes an outward axial cammin force under rotational forces in either rotational direction;

a first tab means projecting radially outward from the periphery of the first end which is adapted to pass yieldingly through the aperture and engage the interior surface, said first tabe means being disposed generally contiguous with the apex of one of said recesses, such that the tab means inhibits removal from an aperture and causes an inward axial force under rotational forces in either rotational direction, whereby under rotational forces the projection and tab means cause opposite axial forces; and a detent projecting from said sleeve, such that the connector is adapted to receive telescopically and the detent to engage an end of a length of corrugated conduit.

2. The connector as set forth in claim 1 further comprising a limiting projection projecting radially into said bore for limiting internal telescopical receipt of the length of corrugated conduit end.

3. The connector as set forth in claim 1 further comprising another projection projecting radially outwardly from the periphery of said first end adjacent said first tab means.

4. The connector as set forth in claim 3 wherein said limiting projection is disposed adjacent one of said arcuate protuberances.

5. A connector for connecting an end of a first corrugated conduit with an arcuate side wall of a second corrugated conduit, which side wall has an aperture therein for receiving the connector, the second conduit having an interior surface defined in part by corrugation valleys and an exterior surface defined in part by corrugation peaks, the distance between the corrugation peaks and valleys being the corrugation depth, the connector comprising:

a generally tubular sleeve having a cylindrical first end, a second end, and a bore extending longitudinally through the sleeve between the first and second ends such that fluids are able to flow through the connector;

said first end having a periphery which has a size and shape to be recived in said aperture, said first end further having alternting generally arcuate recesses and generally arcuate protuberances extending peripherally therearound such that the first end conform substantially with the interior surface of the second conduit, each recess having an apex at its maximum longitudinal recession and each protuberance having an apex at its maximum longitudinal protrusion;

a plurality of circumferentially discontinuous positioning projections which project radially outward from the periphery of said first end, each positioning projection having a face for engaging the corrugation peaks of the exterior surface of the second conduit, whereby the engagement of the projection faces and corrugation peaks of the second conduit orients and positions the generally arcuate recxesses and protuberances of the first end in substantial conformity with the interior surface of the second conduit, the projection faces being longitudinally displaced longitudinally by generally said corrugation depth from the apex of each of said generally arcuate protuberances, such that under rotational forces exerted on the connector in either direction,, the projections cam against the corrugation peaks causing an outward, axial force;

a plurality of tab means which pass yieldingly through the aperture extending radially outward from the periphery of said first end wall for engaging the corrugation valleys of the interior surface of the second conduit, each tab means being disposed generally contiguous with the apex of one of said arcuate recesses, such that under rotational forces exerted on the connector in either direction, the tab means cam against the corrugation valleys causing an inward, axial force, whereby the relative disposition of the tab means and the projection faces enable the tab means and the projection faces to engage the corrugation peaks and valleys of the second conduit in a manner which substantially prohibits rotation of the connector relative to the second conduit by causing opposing axial forces; and said second end being shaped and sized for sliding, telescoping engagement with the end of the first conduit.

6. The connector as set forth in claim 5 wherein the first end has two generally arcuate recesses and two generally arcuate protuberances and wherein the plurality of positioning projections comprises a first pair of positioning projections and the plurality of tab means comprises a pair of tabs.

7. The connector as set forth in claim 6 further including a second pair of positioning projections projecting outward from the periphery of said first end, each of the second pair of positioning projections having a face for engaging the corrugation peaks of the second conduit, each of the projection faces of the second pair being longitudinally displaced by substantially said corrugation depth from one of said tab means.

8. The connector as set forth in claim 5 wherein said bore has a size and shape for telescopically receiving the end of the first conduit longitudinally therein through the second end.

9. The connector as set forth in claim 8 further including limiting means projecting into said bore for abutting the end of the first conduit to limit longitudinal travel of the first conduit from the second end toward said first end.

10. The connector as set forth in claim 9 wherein said limiting means comprises a plurality of limiting projections which project inward from the periphery of the first end, said limiting projections being disposed adjacent each of the positioning faces of said pair of positioning projections, such that the limiting means enables the first corrugated conduit to extend from the second end to generally the corrugation depth from the apex of the arcuate protuberances of the second end, whereby when the first conduit is received in the connector, its corrugations increase the radially compressive strength of the connector.

11. The connector as set forth in claim 5 wherein the first conduit is integral with the second end of the connector.

12. The connector as set forth in claim 5 wherein said second end has a size and shape for being received telescopically within the end of the first conduit.

13. A junction comprising:
a corrugated main having a generally circular aperture in an arcuate side wall thereof, the main having an interior surface defined in part by corrugation valleys and an exterior surface defined in part by corrugation peaks;
a corrugated lateral having an exterior cross section which is dimensioned for being partially received in said aperture; and
a connector comprising a generally tubular sleeve, the sleeve having a cylindrical first end and a second end, the first end having a circular periphery and being received in said circualr aperture, the sleeve having an internal bore in which the corrugated lateral is telescopically received from the second end, the first end of the sleeve terminating in alternating generally arcuate recesses and protuberances which conform generally with the interior surface of the corrugated main, each arcuate recess having an apex at its maximum longitudinal recession, the sleeve having at least one limiting projection projecting radially inward generally adjacent each of said protuberances for limiting the telescopical reception of the corrugated lateral in the internal bore, the limiting projections being further from the second end than apexes of the arcuate recesses such that the corrugated lateral extends from the second end to at least partially within the corrugated main whereby the corrugations of the lateral increase the compressive strength of the sleeve, the sleeve having a plurality of circumferentially discontinuous positioning projections projecting radially outward generally adjacent the arcuate recesses and protuberances which engage the corrugation peaks of the exterior surface of the main for orienting and positioning the arcuate recesses and protuberances such that they conform substantially with the interior surface of the main, a plurality of tab means which pass yieldingly through the aperture extending radially outward from adjacent the first end of the sleeve and engaging the corrugation valleys of the interior surface of the main for securing the connector with the main, and at least one detent extending radially inward from the sleeve and engaging the corrugations of the lateral for securing the connector with the lateral.

14. The junction as set forth in claim 13 wherein said tab means are disposed contiguous with the apex of each arcuate recess, whereby any rotational force in either direction on the connector causes a camming action between the tab means and the interior surface of the main which tends to draw the connector further into the aperture.

15. The junction as set forth in claim 14 wherein the positioning projections are disposed generally adjacent each arcuate protuberances, whereby any rotational force in either direction on the connector causes a camming action between the positioning projections and the exterior surface which tends to pull the connector out of the aperture.

* * * * *

UNITED STATES PATENT AND TRADEMARK OFFICE
CERTIFICATE OF CORRECTION

PATENT NO. : 4,286,808
DATED : September 1, 1981
INVENTOR(S) : James Fouss et al.

It is certified that error appears in the above—identified patent and that said Letters Patent is hereby corrected as shown below:

Column 2, line 52, "projectionproject-" should read -- projection project- --. Column 3, line 16, "corrugatd" should read -- corrugated --; line 53 and 54, "accomodate" should read -- accommodate --. Column 4, line 27, "generlly" should read -- generally --. Column 5, line 9, "empolyed" should read -- employed --; line 44, "the" (last occurrance) should read -- The --. Column 6, line 21, "drainag" should read -- drainage --; lines 67 and 68, "longtitudinal" should read -- longitudinal --. Column 7, line 17, "cammin" should read -- camming --; line 22, "tabe" should read -- tab --; line 60, "recived" should read -- received --; line 61, "alternting" should read -- alternating --; line 64, "conform" should read -- conforms --. Column 8, lines 8 and 9, "recxesses" should read -- recesses --; lines 11 and 12, "longitudinally" should be deleted; line 16, ",," should read -- , --. Column 9, line 23, "circualr" should read -- circular --. Column 10, line 31, "protuberances" should read -- protuberance --.

Signed and Sealed this

Ninth Day of March 1982

[SEAL]

Attest:

GERALD J. MOSSINGHOFF

Attesting Officer  Commissioner of Patents and Trademarks